INVENTOR.
RALPH A. ANDERSEN
By White & Haefliger
ATTORNEYS.

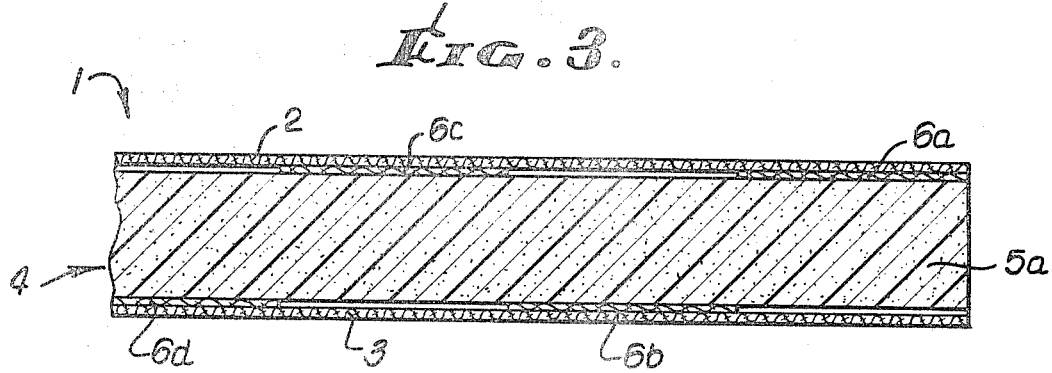
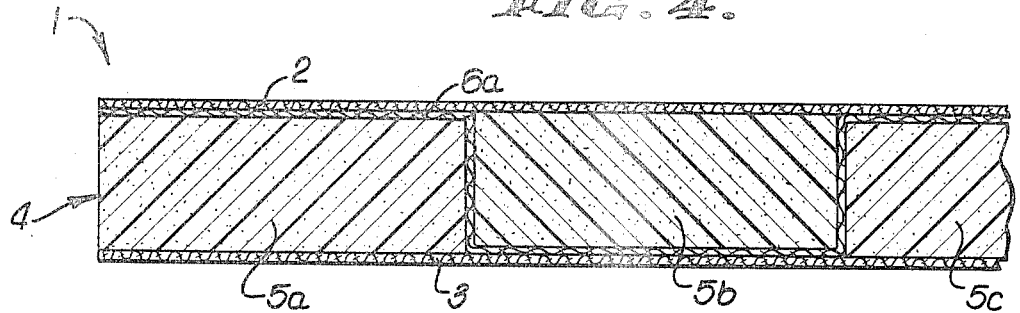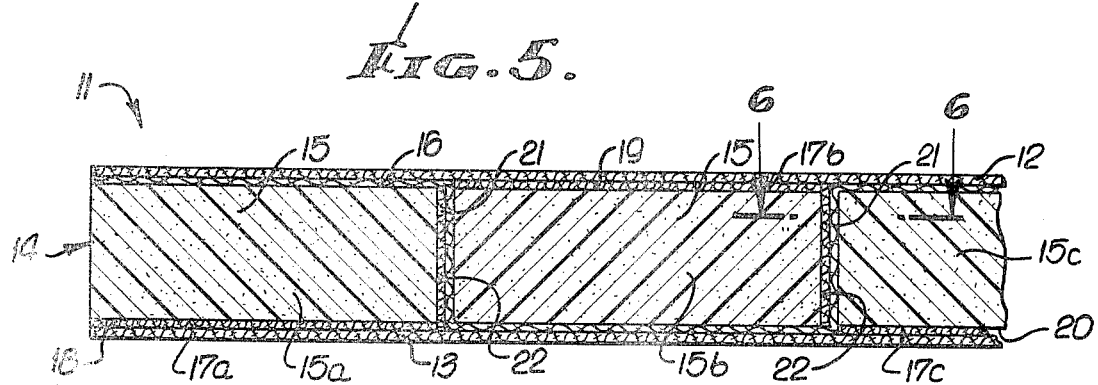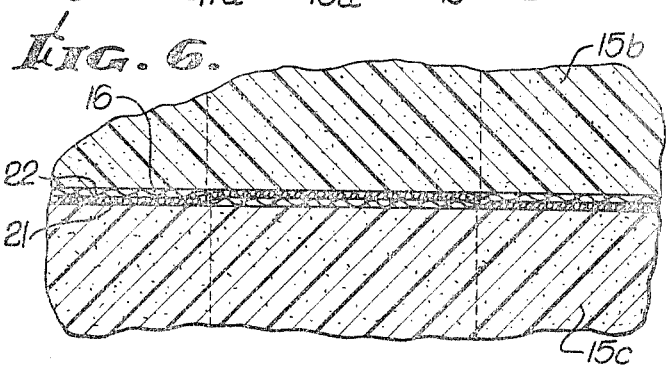

United States Patent Office 3,573,144
Patented Mar. 30, 1971

3,573,144
SANDWICH PANEL TYPE STRUCTURAL ELEMENTS AND METHOD OF MAKING SAME
Ralph A. Andersen, 821 Arcadia Ave., Arcadia, Calif. 91006
Filed Aug. 11, 1969, Ser. No. 848,921
Int. Cl. B32b 5/18
U.S. Cl. 161—38
16 Claims

ABSTRACT OF THE DISCLOSURE

A structural element of the sandwich panel type. The core is novelly formed by interweaving resin-impregnated glass cloth webs and rigid spacer blocks. The core has multiple glass cloth webs, each with multiple block supported corrugations, which corrugations are adjacently offset. This core provides advantageous strength properties to the element, specifically high strength-to-weight ratios, and, as well, large areas for bonding element face sheets to the core.

BACKGROUND OF THE INVENTION

(1) Field of the invention

This invention has to do with composite structures, specifically sandwich panel type structural elements for a variety of uses where light weight, high strength, low cost and long use reliability are required. Foremost among markets demanding structural elements of this character is the aircraft industry. Typical applications in this market include, floor panels and partitions for aircraft, cargo pallets and seat pallets, as well as containers fabricated of these elements, e.g. for containing cargo or in smaller sizes, food items. Other markets where weight has too long been negelected as a factor in design are candidates for use of panels contemplated by the invention. Thus, railroad cars and automobiles, houses and commercial structures are greatly in need of innovative advances in materials and methods. Such an advance is provided by the present invention.

In general, it is known to use panels formed of material composites to obtain the foregoing properties. Sandwich panels, as these panels are termed, are known in which a light weight core of relatively great thickness is bonded between face sheets to form the finished panel.

(2) Prior art

Sandwich panels achieve high modulus or stiffness through use of great thickness relative to weight. Accordingly, lightweight, bulky, relatively weak materials such as foams are sandwiched between relatively heavy and high strength face sheets such as glass cloth sheets. The face sheets are bonded to the core and the sandwich panel produced.

A difficulty in prior known panels of this type has been failure of the bond between the face sheet and the core. This may be occasioned by a dissimilarity of the materials at the bonding interface which precludes maximum integrity in the bond. Other problems have been rupture of the core owing to inherent lack of strength and absence of suitable reinforcement, within the core.

SUMMARY OF THE INVENTION

A major objective of the invention is to provide a structural element of the sandwich type having a unique core construction which at once solves problems of inadequate core integrity and strength and face sheet bonding deficiencies of previously known panels.

In accordance with the invention, this and other objectives of the invention are realized with a structural element which comprises first and second face sheets and a rigid core bonded therebetween. The core comprises parallel rows of alternately oppositely undulated resin impregnated fibrous webs and a series of spacer blocks extending transversely of the web rows and alternately under and over adjacent webs, to define the oppositely undulated arrangement of the webs. The spacer blocks are generally rigid, elongated structures, preferably having a rectangular transverse cross-section which may be formed of balsa wood or a resin foam, such as polyvinyl chloride or foam having a density between 2 and 6 pounds per cubic foot. The webs which are novelly arranged about the spacer blocks in the invention construction are fibrous in nature and may be glass fibers woven into glass cloth and cut into strips. The webs will be resin impregnated, e.g. saturated with a curable epoxy resin in a manner retaining web flexibility for conformation about the periphery of the spacer block, in forming the core. In the final assembly step, the impregnating resin is cured to rigidify the web in its alinement and to firmly bond the face sheets, which may also be resin impregnated glass cloth, to the core structure.

In a modification of the basic structural element, additional reinforcement may be provided by insertion of stiffening members into the core structure. Thus a reinforcing member comprising "boardy," or stiff, strips of woven glass fiber impregnated with a "stiffer" or relatively higher molecular weight resin than that in the undulated webs may be laid parallel to the spacer blocks, e.g. between the blocks and the face sheets and parallel to the plane of the face sheets or between adjacent blocks, edgewise to the face sheets. In either case, the reinforcing member may extend sinuously between successive rows of webs or be contiguous with a spacer block throughout its length.

The structural elements may be constructed by a method which as to the high rigidity core includes weaving plural, adjacent, fusible resin-impregnated fibrous webs oppositely under and over plural transversely disposed longitudinally extended spacer blocks, pressing the blocks together to conform the webs to the periphery of the blocks and bonding the blocks and webs together as with the resin in the webs. The impregnating resin is generally a synthetic organic resin which is curable under heat and/or pressure. The fibrous web is generally glass cloth. The core structure may be assembled into the finished structural element by applying resin impregnated glass cloth face sheets to the faces of the core, peripherally confining the assembly and pressing and heating the core and face sheet assembly to cure the resin and bond the assembly into a unitary structural element with adjacent foam blocks in abutting relation with opposite sides of the webs therebetween.

In a modification of the method, relatively rigid, resin-impregnated glass cloth members may be added transversely to the webs to reinforce the core. These reinforcing glass cloth members may be inserted between adjacent blocks and extended sinuously between the successive rows of webs.

BRIEF DESCRIPTION OF THE DRAWINGS

In the drawings:
FIG. 3 is an enlarged transverse sectional view of the structural element taken along line 3—3 in FIG. 2;
FIG. 4 is an enlarged longitudinal sectional view of the structural element taken along line 4—4 in FIG. 2;
FIG. 5 is a view similar to FIG. 4 of a modification of the structural element by the addition of reinforcing members to the core;
and FIG. 6 is a sectional view taken along line 6—6 in FIG. 5.

DESCRIPTION OF THE PREFERRED EMBODIMENTS

Figure 1:
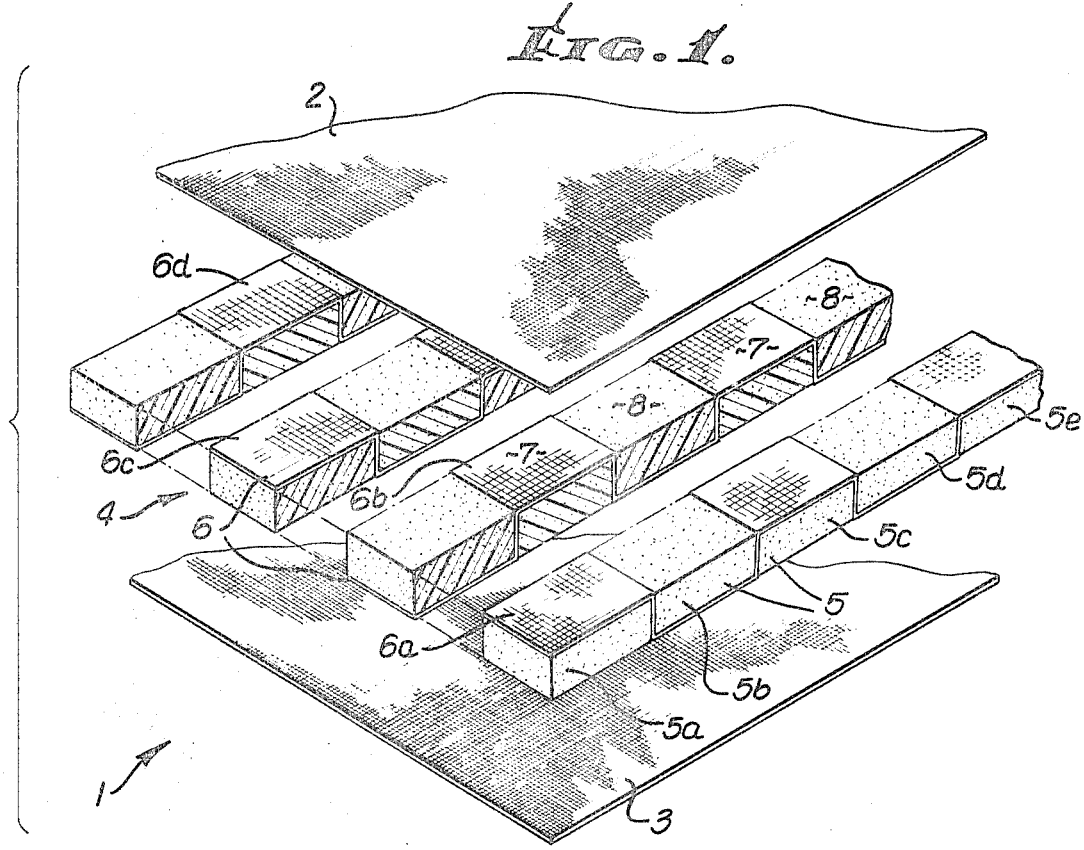
FIG. 1 is an exploded perspective view of the structural element of the invention.

In forming assembly 1 in accordance with the present method, it may be considered that a first strip of glass cloth which has been preimpregnated with a curable resin and which is so limp as to be easily draped is passed alternately under and over a series of spacer blocks which are laid in parallel, spaced from one another and alined transversely to the web length usually at the right or left end of the blocks. Then a second strip is passed alternately over and under the blocks in the series closely adjacent to the first strip and in a manner to pass over those blocks passed under by the first strip so that the first and second strips traverse each block in opposite directions with their relationship being reversed with each succeeding block. Subsequent strips are similarly reversely passed through the block series with adjacent strips being oppositely passed.

In practice one end of each of the strips is fastened to facilitate the weaving operation just described. When all of the strips have been arranged either under or over the first block in the series of blocks and to cover substantially the width of the block with strips, the strips are pulled tight around the periphery of the block; similarly subsequent blocks are drawn tightly to one another and with the glass cloth pressed thereto until all strips are in intimate pressing contact with opposing block surfaces and all blocks are drawn together into a closely arranged mass.

At this point in the fabrication of the present structural elements, the strips and blocks are "woven" together, albeit tightly, but the assembly lacks complete integrity. The strips which undulate alternately through the block series with adjacent strips oppositely so undulating may be considered the "warp" of woven structure and the transverse blocks the "fill" thereof.

The next step in the fabrication of the structural element involves bonding the woven strips and blocks into an integral structure. This is accomplished by "setting" the resin impregnant in the glass cloth strips. While the chemistry and mechanics of this setting operation may vary as set forth below, basically the limp character of the strips which so greatly facilitated the weaving step is removed in favor of a stiffening of the strip in the configuration it has assumed around and between the blocks.

Where the core element is preformed, separate from the structural element itself, the setting of the strips may be accomplished by pressing the core into the desired dimensions with peripheral confinement and top and bottom face pressure and heating as between two heated platens for a time and at a temperature sufficient to set the resin. It will be recalled that the blocks are closely abutted with only the strips therebetween prior to the setting operation. Where the impregnating resin is an epoxy with a catalyst therein, which has been previously B-staged in forming the "pre-preg" strip, a short cure of e.g. 10 to 30 minutes will "set" or harden the epoxy throughout the glass cloth strip and rigidly fix the blocks in their arranged locations.

The face sheets may be bonded to the core during or after core formation, as desired. If, during setting of the core strips, the face sheets, which may themselves be resin impregnated glass cloth, are arranged on opposite faces of the core, the whole mass may be cured at once into a single, integral structural element. In this operation, the resin impregnants of the face sheets and of the strips may flow together under the heat and pressure applied to give a truly unitary structure. In this aspect of the invention, the weaving mode of fabrication provides a further benefit in that substantially half the area of both core faces are comprised of web or strip turns over or under the blocks, whereby very substantial surface areas are available for bonding of the face sheets to the core, which are chemically and physically compatible with the face sheets, e.g. glass cloth pre-preg to glass cloth pre-preg.

Where additional stiffness and/or strength is desired beyond that realized with a structural element fabricated as just described, the reinforcement may be incorporated in the structure during fabrication. While such reinforcement may take many forms, a good improvement in strength with relatively little increase in weight is obtained through the use of additional glass cloth-resin combinations. In a preferred fabrication, strips of glass cloth which have been resin impregnated and processed to a high degree of stiffness, e.g. by advancing the resin in the cloth strip, are combined with the other core components to make a specially, reinforced core. For example, stiff or "broady" strips of epoxy resin impregnated glass cloth may be laid across the top and/or bottom of one or all of the spacer blocks, transversely of the undulating strips and optionally with interweaving of the "boardy" material with the strip portions opposite the top or bottom face of the blocks. Assembly thereafter is the same as above described. Alternatively or additionally boardly strips may be inserted between adjacent blocks either completely contiguous with one of the opposing block side faces or partly, e.g. alternately so, as where the stiffening member is woven through the wrapped strips around the blocks. Preferably the boardly strip is laid against the several downwardly directed webs in contact with a spacer block before the upwardly directed webs are placed over the next spacer block so as to assume a sinuous path across the webs. The final assembly steps are the same as above in completing the cure and/or structural element.

Figure 2:
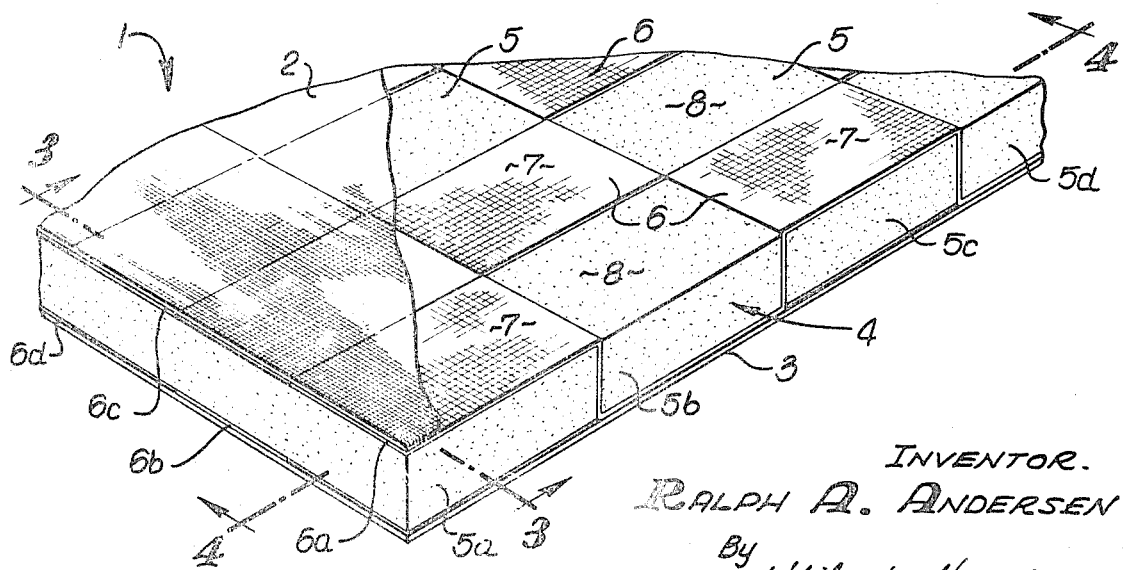
FIG. 2 is a perspective view of an assembled structural element.

The structural element made according to the first described embodiment is shown in FIG. 2 as assembly 1. With reference to FIG. 2 and FIGS. 1, 3 and 4, as well, the assembly 1 is comprised of a first, top face sheet 2, a second, bottom face sheet 3 and a composite core 4 sandwiched therebetween. The face sheets 2, 3 are preferred to be and are shown as single piece, plural ply or woven glass cloths of a relatively fine mesh which have been impregnated with a resin, typically epoxy or polyester resin, to be cured in the final step of fabrication.

The core 4 comprises spacer blocks 5 which are preferably lightweight cellular blocks e.g. of balsa wood or of foam material such as synthetic organic plastic foam e.g. polyvinyl chloride foam. The spacer blocks 5 are preferably rectangular in transverse cross section as shown, although they may be any other desired cross-section, arranged in a parallel series as blocks 5a, 5b, 5c, 5d and 5e, etc. The blocks are preferably rigid, open cell or closed cell foams and may be thermoplastic foams such as foams of a polyolefin including polyvinyl chloride, as mentioned, polystyrene or polyethylene foams or thermoset foams e.g. polyurethane or phenolic foams. Density should be as low as possible consistent with desired strength attributes to maintain in spaced relation the strips 6 which pass around the blocks 5. For a rigid polyvinyl chloride foam, a density between 2 and 20 pounds per cubic foot and preferably between 2 and 6 pounds per cubic foot is suitable. The particular chemical composition of the various polyvinyl chloride and other foams is not critical, provided fire retardant properties are afforded where end-use requirements dictate.

The core 4 further comprises strips 6. The strips 6 are fibrous webs which extend through the core 4 in the described undulating manner defined by the shape and spacing of blocks 5. While glass fiber is the material of choice in the strips 6, other natural or synthetic, organic or inorganic fibrous materials such as hemp, jute, wool, cotton, nylon, polyester (Dacron), polypropylene, graphite and metallic fibers may be used in place of all or a part of the glass fiber in the strips 6. Glass is preferred, of course, for its cost, strength and weight advantages. The glass cloth used to form strips 6 may be relatively coarse in structure and have a preponderance of longitudinal or "warp" fibers relative to the transverse or "fill" fibers. With reference to FIGS. 1–4 the strips 6a, 6b, 6c, 6d, representative of relatively narrow webs of glass cloth arranged along the full width foam blocks 5a–e, alternate in adjacent pairs in being over or under block 5a and oppositely in being under or over block 5b and so on for each of strips 6a–d with respect to each of blocks 5a–e. The result is a grid of alternating glass fiber rectangles 7 and foam block rectangles 8 on the top and bottom face of the assembly core 4. This relationship is clearly seen in FIG. 1 where the blocks 5 have been broken transversely along the line between adjacent strips 6, and the sections separated.

The top and bottom face sheets 2, 3 are applied to the core 4 as above described. These face sheets may be unitary sheets e.g. of metal such as aluminum or titanium or composites such as glass-resin composites especially glass cloth with epoxy resin impregnation. As with the other glass-resin combinations discussed herein, the face sheet cloth is commercially available and need not be explained in detail as to glass, weave, mesh or resin impregnant.

A signal advantage of the present assembly 1 over previously known sandwich panels of glass cloth pre-preg and balsa wood or foam is in the amount of core surface area having glass cloth coverage for ready bonding to a glass cloth face sheet overlay. Half the area of each core face is glass cloth; see the glass fiber rectangles 7 in FIGS. 1 and 2 and these highly bondable areas are distributed throughout the face area. Intimate bonding is easily realized at the interfaces of the glass cloth pre-preg due to the compatability of their impregnating resins e.g. epoxy resins, which results in a single bond between adjacent layers of glass fiber.

The resin used to preimpregnate the glass cloth or other fibrous strip and sheet used in the present structural element is preferably epoxy, as indicated, and particularly the diglycidyl ether of 2,2-bis (4-hydroxyphenyl) propane with suitable amine, acid, or complex hardeners. In practice, any resin having an epoxy equivalency greater than 1.0 such as may be obtained from the reaction of dihydric and preferably polynuclear dihydric phenols and a stoichiometric excess of an epoxy precursor such as epichlorohydrin may be employed, as may epoxies derived from peracetic acid. Thermoplastic versions of these reaction products characterized by a number of repeating units in excess of 80, such as the polyhydroxyethers, may also be used. Other resins suitable for use in these structural elements include polyesters and phenolics. The thermosetting resins may be partially cured or advanced in molecular weight, i.e. B-staged prior to final arrangement of the glass strips 6 about the blocks 5, for convenience in handling. Cure conditions following fabrication are conventional and dependent on the resin employed. Of course, with the thermoplastic resins, no cure is required. The thermoplastic resin must merely be fluxed into intimate contact with the glass or other fiber, as by heat and pressure. The term "fusible" resin herein thus refers to both incompletely cured thermosetting resins and thermoplastic resins.

In FIGS. 5 and 6 an alternative embodiment of the invention, involving the use of separate stiffening members, is illustrated. The modified assembly 11 includes top and bottom face sheets 12 and 13 and a core 14 composed of foam blocks 15 and strips of glass cloth 16 as in the embodiment of FIGS. 1–4. In addition to these components, there is further provided in this embodiment a stiff and boardy reinforcing strip 17a, as above described, parallel to and in contact with the bottom face 18 of block 15a, another similar reinforcing strip 17b parallel to and in contact with the face 19 of the block 15b, and another similar reinforcing strip 17c parallel to and in contact with bottom face 20 of block 15c, et cetera. The face sheets 12 and 13 are secured to the core 14 as in the previous embodiment with the reinforcing strips 17a–c parallel to the plane of the face sheets 12, 13.

In addition, further strengthening may be realized through the use of reinforcing strips 21 of the same "broady" nature but laid between adjacent blocks e.g. blocks 5a and 5b or between 5b and 5c and normal, or edgewise, to the plane of face sheets 12, 13, as shown in FIG. 5, in contact with side faces 22 of these blocks. As mentioned above, these normal reinforcing strips may be contiguous throughout their extent with the adjacent foam block or preferably will be between the strips 16 so as to assume a sinous disposition in the final assembly as shown in FIG. 6 in contact alternately with opposite sides of strips 16.

EXAMPLE

A sandwich panel structural element was made using strips of fiberglass broadgoods, on the order of one-half inch wide, as the "warp" threads which had been preimpregnated with resin and which was now in the partially cured state; cured to the point where the material had drape and was not stiff. Initially, one of the ends of each of the strips that go to make up the width of the finished element were fastened by mechanical means.

Alternate strips were then moved in opposite directions, one strip upward and the next strip downward. Thus, one-half of the alternate strips was positioned upward in such fashion that approximately a six inch length immediately in front of the holddown point was vertical, at 90 degrees to its initial position. The other one-half of the strips were positioned downward in a similar fashion. Thus, the alternate strips were 180 degrees apart. At this time, a foam spacer block or mandrel was laid into position, such that its rear edge was tightly positioned against the fiberglass strips. The foam block was square or rectangular in cross-section and was made of a light-weight cellular polyvinyl chloride material. These blocks were each .375 inch high, one inch wide and several multiples of the strip's width in length. With the block so positioned the strips of fiberglass oriented upward were moved to a downward orientation, while the downward oriented strips were moved to an upward orientation. Sufficient pressure was applied to the strips to ensure they conformed tightly to the periphery of the foam block during the strip transition. Thereupon, another foam mandrel was positioned tightly up against the fiberglass strips. The procedure was repeated with the strips alternating direction until the panel has the desired length.

The above represents the core portion of the structural element. Face sheets of unidirectional preimpregnated fiberglass material were laid up as the top and bottom face sheets, utilizing a number of plies laid crosswise. The entire assembly was placed in a heated platen press to cure the resin impregnant. During this curing process a "picture frame" was provided around the periphery of the of the assembly to act as a gauge stop for the platens and to restrain the assembly from extruding outward during cure.

I claim:

1. Structural element comprising first and second face sheets and a rigid core therebetween, said core comprising parallel rows of alternately oppositely undulated resin-impregnated fibrous webs and a series of cellular spacer blocks extending transversely of said rows and alternately under and over adjacent webs to define the oppositely undulated arrangement of the webs, said face panels and webs being bonded together.

2. Structural element according to claim 1 in which said spacer blocks are rigid synthetic organic plastic foam.

3. Structural element according to claim 2 in which said foam spacer blocks are rectangular in transverse cross section and comprise a foamed polyvinyl chloride resin.

4. Structural element according to claim 1 in which said webs comprise woven glass fibers.

5. Structural element according to claim 4 in which said face sheets comprise woven glass fibers and are resin impregnated.

6. Structural element according to claim 5 in which epoxy resin is impregnated into the webs and face sheets and bonds said core and face sheets together.

7. Structural element according to claim 6 in which said spacer blocks comprise a polyvinyl chloride foam having a density of 2 to 6 pounds per cubic foot.

8. Structural element according to claim 1 including also a reinforcing member laid along a spacer block and comprising stiff strips of resin-impregnated, woven glass fiber.

9. Structural element according to claim 8 in which said strips are laid between adjacent blocks edgewise to the face panels.

10. Structural elements according to claim 8 in which said reinforcing strip is extended sinuously between successive webs and between adjacent spacer blocks.

11. In fabricating structural elements having a high rigidity core, the method that includes weaving plural, adjacent, fusible resin-impregnated fibrous webs oppositely under and over plural transversely disposed longitudinally extended spacer blocks, pressing the blocks together, conforming said webs to the periphery of the blocks and bonding said blocks and said webs together with said resin.

12. Method according to claim 11 including also applying a face sheet to the core and bonding the same thereto with said resin.

13. Method according to claim 12 in which the face sheet is a glass cloth impregnated with fusible resin and including also pressing said face sheet and core together and fusing said resin to bond together said free sheet and core.

14. Method according to claim 11 in which said impregnating resin is a curable synthetic organic resin and said fibrous web comprises woven glass fiber and including also applying resin-impregnated glass cloth to the faces of said core, peripherally confining the assembly and pressing and heating the core and face sheet assembly to cure said resin and bond said assembly together with adjacent blocks in abutting relation with opposite sides of said webs.

15. Method according to claim 11 including also weaving relatively rigid resin impregnated glass cloth through said webs along a face of a spacer block to reinforce said core.

16. Method according to claim 15 including also inserting said reinforcing glass cloth sinuously between successive webs between adjacent spacer blocks.

References Cited
UNITED STATES PATENTS

| | | | |
|---|---|---|---|
| 2,493,032 | 1/1950 | Rheinfrank, Jr. | 161—69 |
| 3,339,326 | 9/1967 | Derr et al. | 161—38X |
| 3,003,810 | 10/1961 | Kloote et al. | 161—161X |
| 3,331,173 | 7/1967 | Elsner | 161—161X |
| 3,274,046 | 9/1966 | Shannon et al. | 161—36 |

PHILIP DIER, Primary Examiner

U.S. Cl. X.R.

161—39, 69, 161; 52—204; 156—148, 212